United States Patent [19]

Nickens et al.

[11] Patent Number: 5,427,157
[45] Date of Patent: Jun. 27, 1995

[54] APPARATUS AND METHOD FOR CONTROLLED PENETRATION OF COMPRESSED FLUID CYLINDERS

[75] Inventors: Dan A. Nickens, Orlando; Charles C. Mattern, Clermont, both of Fla.

[73] Assignee: Earth Resources Corporation, Ocoee, Fla.

[21] Appl. No.: 70,709

[22] Filed: May 28, 1993

[51] Int. Cl.⁶ .................................... B67B 7/46
[52] U.S. Cl. ........................... 141/1; 141/51; 141/65; 141/330; 408/1 R; 222/87; 29/403.1
[58] Field of Search .............. 141/1, 4, 8, 51, 52, 141/65, 66, 85.93, 97, 329, 330, 95, 70; 137/318; 588/259; 408/1 R, 2, 7, 12; 29/403.1, 403.3, 426.1, 426.4; 414/412; 222/87

[56] References Cited

U.S. PATENT DOCUMENTS

| 45,183 | 11/1864 | Sexton . | |
|---|---|---|---|
| 314,085 | 3/1885 | Norman . | |
| 572,786 | 12/1896 | Downey . | |
| 2,911,859 | 11/1959 | Longley et al. | 408/1 R |
| 3,364,939 | 1/1968 | Valenziano | 408/1 R X |
| 3,495,615 | 2/1970 | Ehrens et al. . | |
| 3,821,965 | 7/1974 | Reynolds | 137/318 |
| 3,974,846 | 8/1976 | Serota . | |
| 3,983,756 | 10/1976 | Danguillier et al. . | |
| 3,995,655 | 12/1976 | Sands | 137/318 |
| 4,166,481 | 9/1979 | Farris et al. | 141/1 |
| 4,350,052 | 9/1982 | Kendall . | |
| 4,399,829 | 8/1983 | Schuler . | |
| 4,475,566 | 10/1985 | Haines . | |
| 4,690,180 | 9/1987 | Gold | 141/51 |
| 4,966,317 | 10/1990 | Barr . | |
| 5,035,269 | 7/1991 | Pytryga et al. . | |
| 5,076,311 | 12/1991 | Marschke | 137/15 |
| 5,114,043 | 5/1992 | Collins, Jr. | 141/65 X |
| 5,163,462 | 11/1992 | Leemput et al. . | |
| 5,163,483 | 11/1992 | Eckman . | |
| 5,174,344 | 12/1992 | Gonzalez-Miller et al. | 141/65 |
| 5,340,244 | 8/1994 | Hawley et al. | 141/51 X |

FOREIGN PATENT DOCUMENTS 950614 9/1956 Germany .
1607991 10/1970 Germany .

OTHER PUBLICATIONS

U.S. Army Chemical Material Destruction Agency, *Generic Site Scoping Study*, Dec. 3, 1993 pp. 7-15-7-18.
Department of the Army, Office of the AMC Program Manager for Demilitarization of Chemical Material, "Supplement C to Project Eagle—Phase II Demilitarization and Disposal of the M34 Cluster at Rocky Mountain Arsenal Final Plan" (Feb. 1973), pp. viii–ix, 15–21, IC–1, 2C–15.
Solkatronic Chemicals Inc., *Instruction Manual for Model 5502 Emergency Response Containment Vessel*, Oct. 1990.
American Petroleum Institute, "Procedures for Welding or Hot Tapping on Equipment Containing Flammables," API Publication 2201, Third Edition, Oct. 1985.
(List continued on next page.)

Primary Examiner—J. Casimer Jacyna
Attorney, Agent, or Firm—Baker & Botts

[57] ABSTRACT

A drill assembly (44) for penetrating a wall (85) of a container (14) is provided. The container (14) is supported by a platform (30) within a recovery vessel (12). The drilling assembly (44) allows removal of a fluid from the container (14). The drilling assembly (44) includes a tube (88) for lining a first opening (42) into the recovery vessel (12), as well as a first housing (90) having an interior (80). A first adapter (94) couples the housing (90) to a first end (89) of the tube (88) to partially define a longitudinal bore (82). A shaft (102) is rotatably disposed within the longitudinal bore (82). The shaft (102) has one end for engagement with a drill bit (84) with the other end for engagement with a motor (46). The drill bit (84) is engaged to the shaft (102) to penetrate the container wall (85), while the motor (46) is engaged to the other end of the shaft (102). A first seal assembly (98) forms a first fluid barrier between the interior (80) and the longitudinal bore (82).

31 Claims, 3 Drawing Sheets

OTHER PUBLICATIONS

Memo, New Jersey State Department of Environmental Protection, Feb. 4, 1982, two pages.

"No Known Treatment For Accident Victims," *Sunday Times*, Trenton, New Jersey, Feb. 28, 1982, p. 87.

"This Stuff Is Getting To All Of Us!," *Fire Engineering*, Apr. 1983, pp. 21, 25–28.

"Poison Spills Impact Remains," *Richmond Times–Dispatch*, Mar. 16, 1983, pp. A1–A2.

"Something Out Of A Space Movie," *Richmond Times–Dispatch*, Feb. 1982, pp. A1–A2.

"Pentaborane Release, Environmental Laboratories, Hanover County, Va.," National Response Team Briefing, Mar. 1982, pp. 1–2.

Memo, CECOS International, Inc. to Environmental Emergency Branch, Mar. 17, 1982, pp. 1–5.

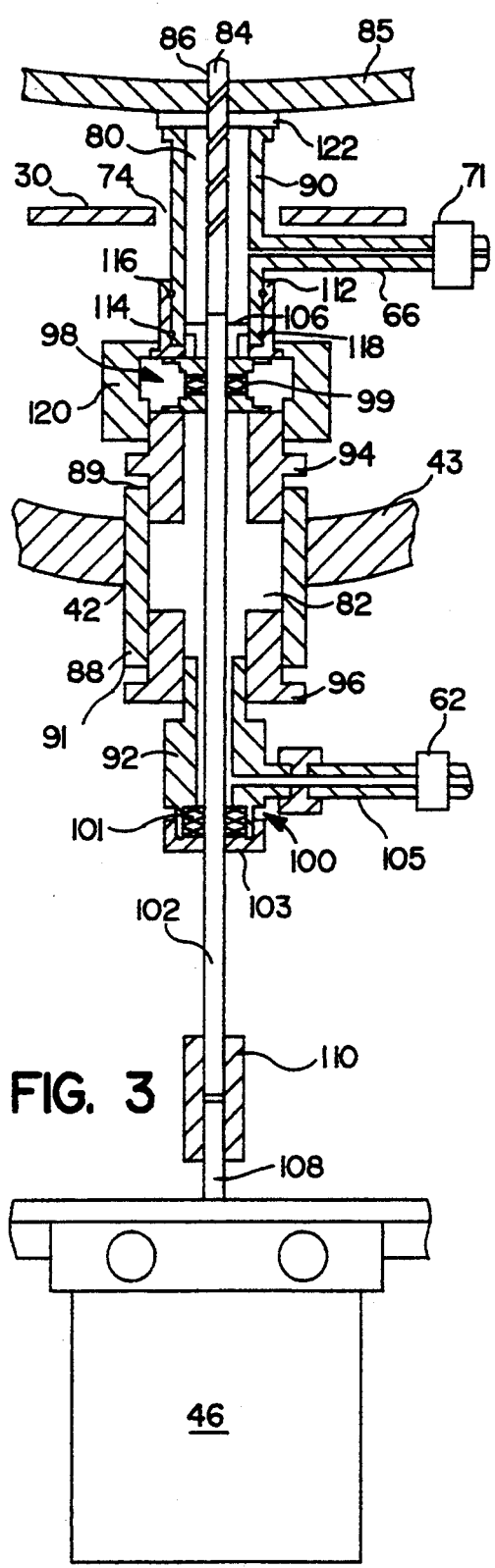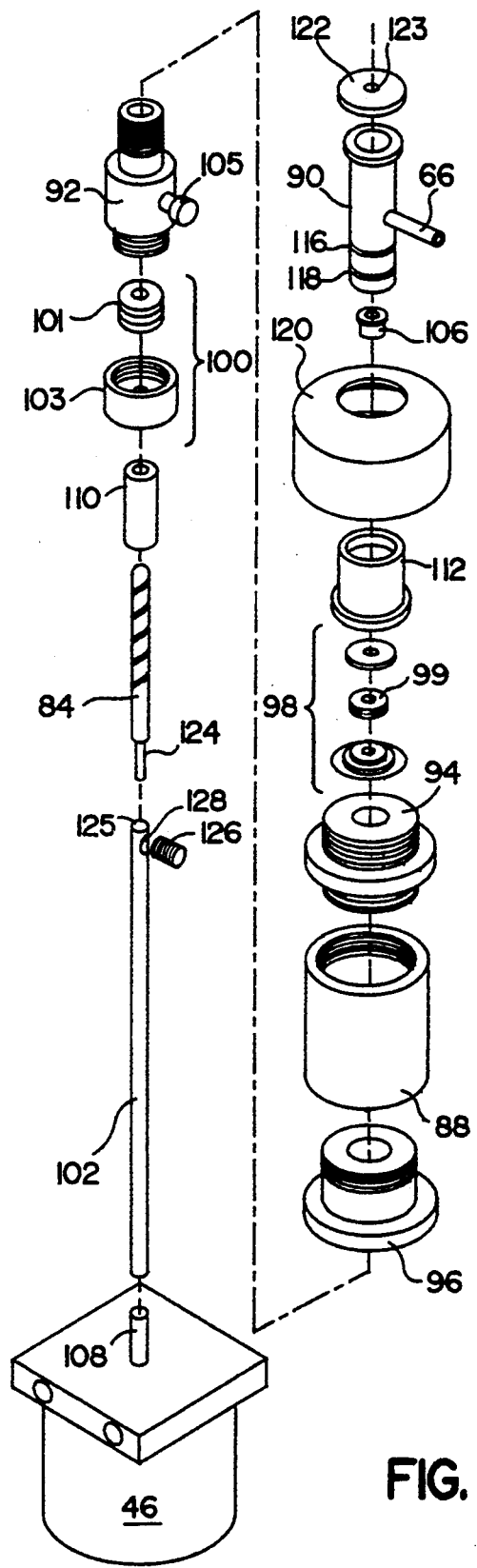

APPARATUS AND METHOD FOR CONTROLLED PENETRATION OF COMPRESSED FLUID CYLINDERS

TECHNICAL FIELD OF THE INVENTION

This invention relates to the field of managing compressed fluid cylinders and particularly compressed fluid cylinders in a deteriorated condition.

BACKGROUND OF THE INVENTION

Compressed fluid cylinders may become unserviceable for several reasons such as valve assembly failure, damage or deterioration to the cylinder body, and/or damage or deterioration of pipe/hose connections associated with the valve assembly. The hazardous nature of compressed gas cylinders and other fluid containers in a deteriorated condition has become the focus of increasing attention. The result has been strict government regulations which limit the uncontrolled discharge of such container contents to the environment.

Examples of cylinder rupture vessels or containment vessels used for safely removing hazardous contents from deteriorated compressed fluid cylinders are shown in U.S. Pat. No. 4,690,180 titled "Cylinder Rupture Vessel"; U.S. Pat. No. 4,944,333 titled "Cylinder Rupture Vessel with Clamps for Immobilizing a Container Within the Vessel", and U.S. Pat. No. 5,186,219 titled "Cylinder Rupture Vessel". These patents disclose containment vessels and their associated systems to secure a fluid cylinder or similar container within the containment vessel and to puncture or pierce the cylinder in a safe, controlled manner. The cylinder rupture vessels and their associated systems allow for environmentally acceptable removal of the contents from the cylinder and further processing of the contents as desired. The above-listed patents are incorporated by reference for all purposes within this application.

Deteriorated fluid cylinders may be ruptured in a safe, controlled manner by using a puncture spike or punch as shown in U.S. Pat. No. 4,690,180. Hydraulic puncture assemblies, as shown in U.S. Pat. No. 4,944,333, have also been used to penetrate fluid cylinders to allow the controlled release of the contents of the cylinders within a containment vessel. In addition, various types of projectiles have previously been fired at fluid cylinders positioned within a containment vessel to rupture the walls of the fluid cylinder to release the contents from the fluid cylinder into the interior of the containment vessel.

SUMMARY OF THE INVENTION

In accordance with the present invention, a drilling assembly for penetrating a wall of a container is provided. The container is supported by a platform within a recovery vessel. The drilling assembly allows removal of a fluid from the container. The drilling assembly includes a tube for lining a first opening into the recovery vessel, as well as a first housing having an interior. A first adapter couples the housing to a first end of the tube to partially define a longitudinal bore. A shaft is rotatably disposed within the longitudinal bore. The shaft has one end for engagement with a drill bit with the other end for engagement with a motor. The drill bit is engaged to the shaft to penetrate the container wall, while the motor is engaged to the other end of the shaft. A first seal assembly forms a first fluid barrier between the interior and the longitudinal bore.

A first technical advantage of the present invention is that it provides three levels of containment for protecting the environment from exposure to a fluid removed from a container.

A second technical advantage of the present invention is that it increases the efficiency of the process by which a hazardous fluid is removed from a container.

A third technical advantage of the present invention is that it reduces the risk of ignition of a fluid during its removal from a container.

A fourth technical advantage of the present invention is that it reduces the risk of a fluid reacting violently with surfaces exposed to the fluid during its removal from a container.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 is an exploded view of a drill assembly for penetrating the container of FIGS. 1 and 2; and FIG. 4 is an exploded isometric view of the drill assembly of FIG. 3.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

As an overview of the present invention, a fluid recovery system 10 provides a sealed recovery vessel 12 for receiving container 14. The contents of container 14, typically hazardous waste fluids, can then be removed without polluting the environment by using recovery system 10. The pressures under which the fluid contents may be stored in container 14 can range up to approximately 6000 psi. Additionally, the fluid within container 14 may be in a gas phase, a liquid phase or a combination of both a gas and liquid phase. Typically, container 14 has been sealed shut either purposely or inadvertently, and cannot be emptied by normal procedures. After the fluid is removed from container 14, the fluid and container can be disposed of safely. Recovery system 10 allows for removal of any hazardous fluids within container 14 from a remote location to ensure the safety of personnel controlling the fluid recovery process.

Figure 1:
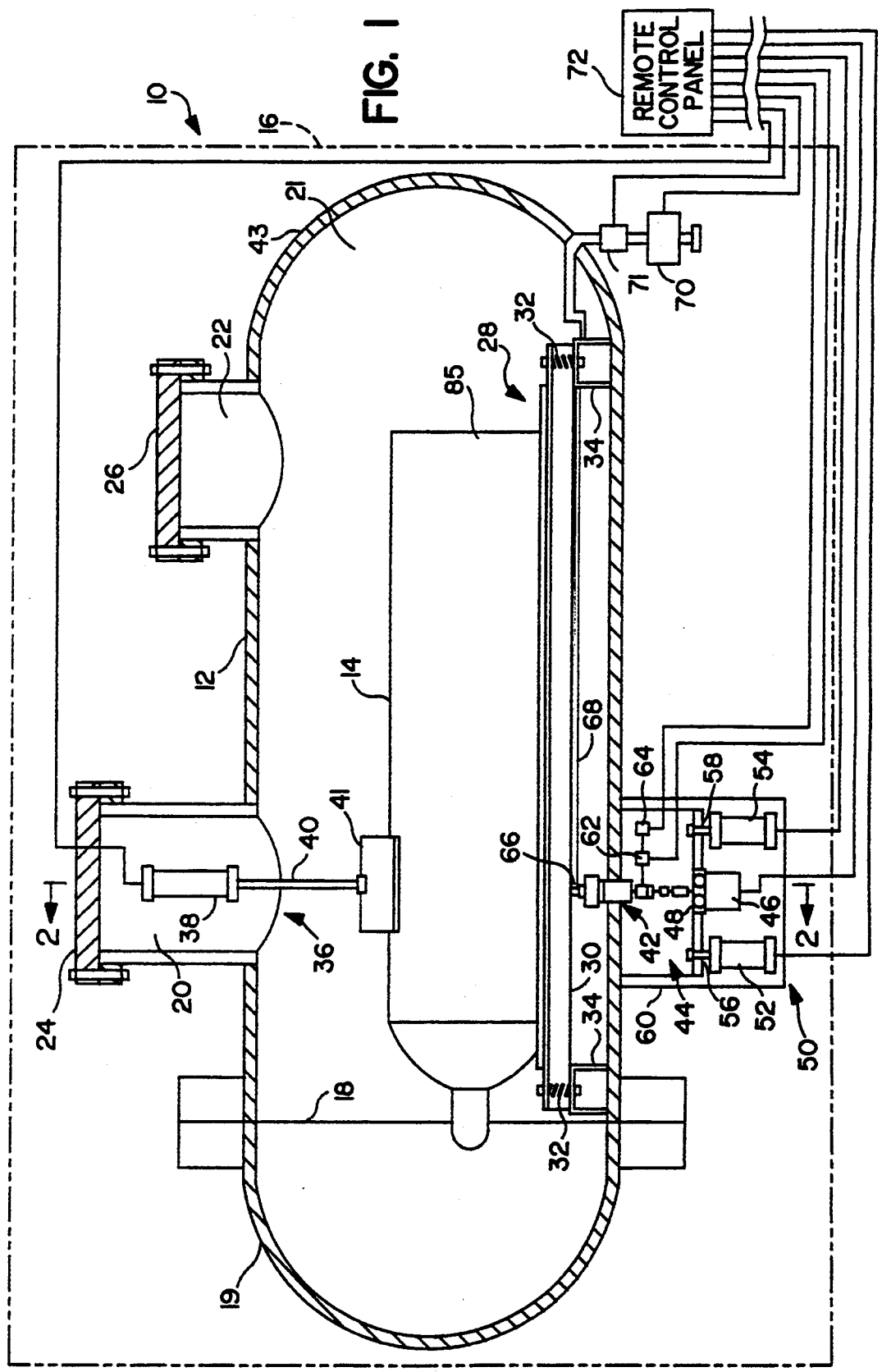
FIG. 1 is a fluid recovery system for recovering fluid from a sealed container.

More specifically, FIG. 1 is a side view of fluid recovery system 10. Fluid recovery system 10 is typically housed in a sealed trailer 16 to allow movement of fluid recovery system 10 to the location of any deteriorated containers. Thus, safety is increased by avoiding transportation of the deteriorated containers, as well as by providing a third level containment. (The trailer being the third level, with recovery vessel 12 being the second level, and drill assembly 44 being the first level, as is discussed below.)

Fluid recovery system 10 includes a recovery vessel 12 which has a sealable end opening 18 through which container 14 may be inserted. End closure 19 is then secured to end opening 18 to seal the interior 21 of recovery vessel 12 from the environment. A fluid tight barrier is preferably maintained between the interior 21 and the exterior of recovery vessel 12.

Recovery vessel 12 also includes two access openings 20 and 22. Access openings 20 and 22 provide additional entries into interior 21 of recovery vessel 12. Closures 24 and 26 seal interior 21 from the environment when secured to access openings 20 and 22 respectively.

Although recovery vessel 12 and container 14 are shown as cylinders, various sizes, shapes and configurations of recovery vessels and containers may be satisfactorily used with the present invention.

Container 14 is placed on platform assembly 28 disposed within recovery vessel 12. Platform assembly 28 includes a platform 30 which is supported by four springs 32. Springs 32 are respectively attached to the interior of recovery vessel 12 by four support members 34. Springs 32 of platform assembly 28 allow platform 30 to move in a plane perpendicular to that of platform 30.

Fluid recovery system 10 also includes a hold-down assembly 36 having a hydraulic cylinder 38, hydraulic piston rod 40, hold-down clamp 41 and a support member (not shown) for securing hydraulic cylinder 38 to the interior portion of wall 43 of recovery vessel 12.

An opening 42 extends through wall 43 of recovery vessel 12 and provides drill assembly 44 with access to container 14. Drill assembly 44 is discussed in greater detail below in conjunction with FIGS. 3 and 4. Drill assembly 44 is driven by a drill motor 46 which is secured to motor support 48.

Drill assembly 44 and drill motor 46 are positioned relative to container 14 by drill positioning assembly 50. Drill positioning assembly 50 includes two hydraulic cylinders 52 and 54. Piston rods 56 and 58, which are positioned by cylinders 52 and 54 respectively, are coupled to motor support 48. Frame 60 secures cylinders 52 and 54 to the exterior of wall 43 of recovery vessel 12. Opening 42, drill assembly 44, motor 46, motor support 48 and drill positioning assembly 50 are preferably located on the exterior of wall 43 of recovery vessel 12 opposite from container 14 and platform 30. The specific location of opening 42 may be selected along with the location of platform assembly 28 and hold-down assembly 36 to optimize the performance of drill assembly 44 to penetrate container 44. The optimum location may vary depending upon the fluids which will be released and the type of container containing the fluids.

Hold-down assembly 36, drill positioning assembly 50, drill motor 46, valve 64 and valve 70 are all capable of being controlled remotely from remote control panel 72. Remote control panel 72 is typically located outside of trailer 16 at a distance sufficient to provide for safe operation.

Figure 2:
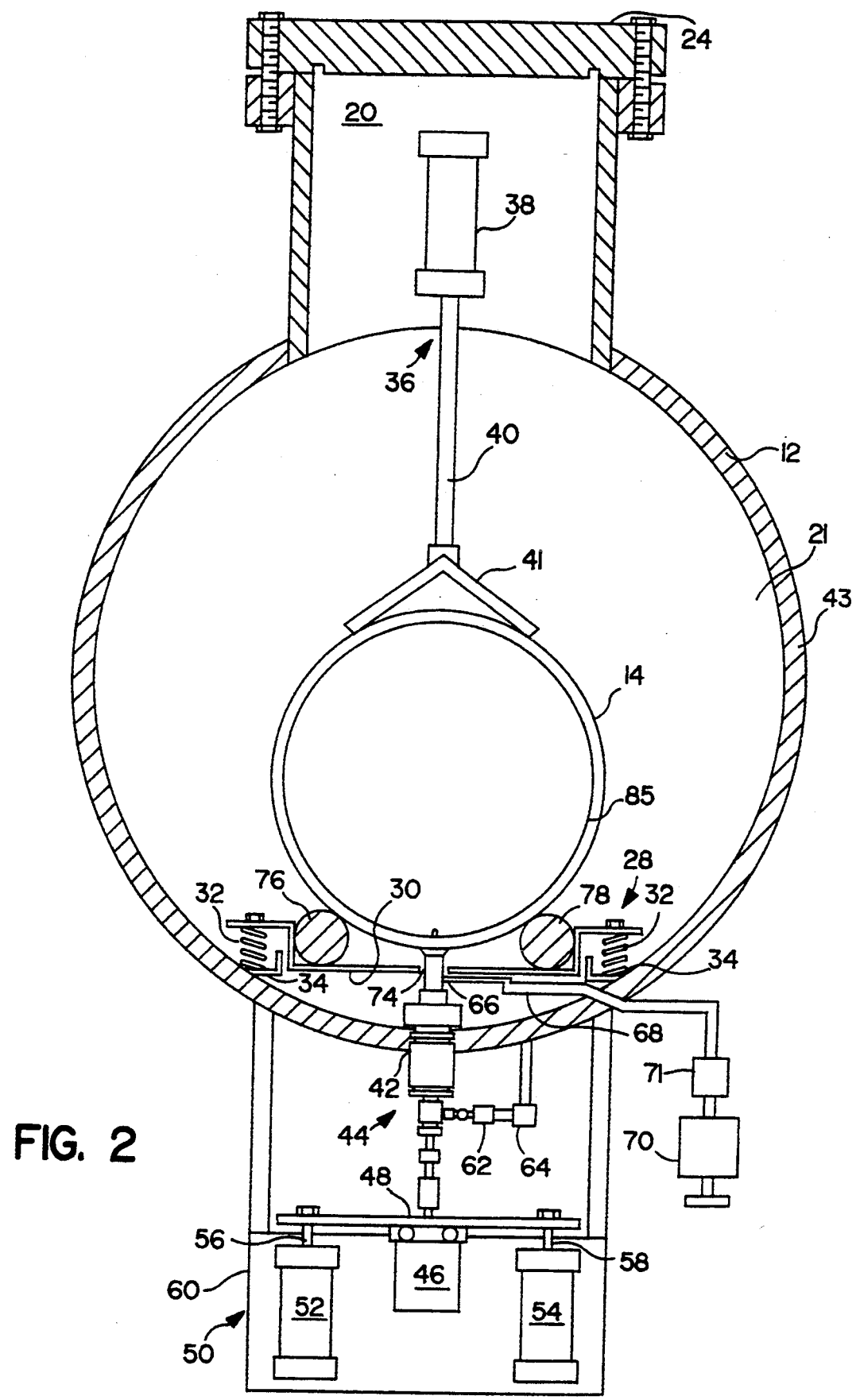
FIG. 2 is a view of the fluid recovery system of FIG. 1 along lines 2—2 of FIG. 1.

FIG. 2 shows an end view of the fluid recovery system 10 of FIG. 1 along lines 2—2. In FIG. 2 an opening 74 is shown in platform 30 to accommodate drill assembly 44. Two rails 76 and 78, which are part of platform assembly 28, are disposed along the outer edges of platform 30. Rails 76 and 78 cooperate with hold-down assembly 28 to prevent container 14 from rolling on platform 30. Drill assembly 44, motor 46, support 48 and drill positioning assembly 50 are shown disposed in another possible orientation with respect to recovery vessel 12. Such orientation does not affect the operation of fluid recovery system 10.

Referring again to FIG. 1, a pressure transducer 62 is coupled to a port 105 of drill assembly 44. A valve 64 is coupled between transducer 62 and interior 21 recovery vessel 12. Inside recovery vessel 12, drill assembly 44 includes a cylindrical evacuation port 66 which is coupled to a pipe 68. Pipe 68 is coupled through wall 43 of recovery vessel 12 to a valve 70. A second pressure transducer 71 is also coupled to pipe 68. Pressure transducers 62 and 71 may be monitored from control panel 72. Valves 64 and 70 may be operated from control panel 72. FIG. 2 shows transducers 62 and 71, valves 64 and 70, evacuation port 66 and pipe 68 disposed in another possible orientation with respect to recovery vessel 12. Again, such orientation does not affect the operation of fluid recovery system 10.

In operation container 14 is carefully placed upon platform assembly 28 through end opening 18. End closure 19 is then closed to seal container 14 inside recovery vessel 12. Trailer 16 is sealed as well. Hydraulic cylinder 38 is activated to urge, via hydraulic piston rod 40 and hold-down clamp 41, container 14 toward platform assembly 28. Support springs 32 are compressed, allowing platform 30 to be moved toward opening 42 and drill assembly 44. Container 14 is continually urged downward until drilling assembly 44 makes sealable contact with the exterior of container 14, as shown in FIG. 2. Hold-down assembly 36 then maintains container 14 in this position.

After a fluid seal is established between drill assembly 44 and the exterior of container 14, an interior portion 80 (FIG. 3) of drill assembly 44 is filled with an inert gas. Transducer 62 monitors the pressure in a longitudinal bore 82 (FIG. 3) of drill assembly 44. If the pressure increases, a leak between interior portion 80 and longitudinal bore 82 is indicated. When such a leak occurs, drill assembly 44 must be disassembled and repaired. If no leak is detected, motor 46 is activated and rotates a drill bit 84 (FIG. 3). Drill positioning assembly 50 urges drill bit 84 forward until it makes contact with and penetrates wall 85 of container 14. Any fluid waste within container 14 may then be withdrawn through the penetration 86 via interior portion 80, evacuation port 66, pipe 68 and valve 70. By confining the fluid to the relatively small volume of interior 80, rather than the much larger volume of recovery vessel 12, the fluid removal efficiency is increased. That is, by minimizing the number of surfaces to which the fluid is exposed (the inside wall of interior 80 versus the interior side of wall 23 and the outside of wall 85), the decontamination of these surfaces is minimized.

FIG. 3 is an exploded view of drill assembly 44 as installed in FIGS. 1 and 2. Referring to FIG. 3, opening 42 in wall 43 of recovery vessel 12 is provided for installation and support of drill assembly 44. Cylindrical tubing 88 lines the inside diameter of opening 42. For this embodiment, cylindrical tubing 88 is welded within opening 42, although any other form of attachment may be used, such as threading both the outer surface of cylindrical tubing 88 and the inside diameter of opening 42.

Drill assembly 44 includes a first housing section 90 and a second housing section 92. First adapter 94 is provided to secure first housing section 90 to end 89 of tubing 88 within recovery vessel 12. Second adapter 96 is provided to secure second housing section 92 to end 91 of tubing 88 on the exterior of recovery vessel 12. A plurality of matching threads are used to attach first and second adapters 94 and 96 with their respective first housing section 90 and second housing section 92 to ends 89 and 91 of tubing 88. Housing sections 90 and 92, adapters 94 and 96 and tubing 88 cooperate with each other to define longitudinal bore 82 extending therethrough.

A first seal assembly 98, having a first packing 99, is placed on the end of first adaptor 94 opposing the end threaded into tubing 88. A second seal assembly 100, having a second packing 101, is retained within second housing section 92 by packing nut 103. Second housing section 92 is threaded into the inside surface of second adaptor 96. Thus, longitudinal bore 82 is formed from the interior of adapter 94, through tube 88, to the interior of adapter 96. Evacuation port 66 allows access to interior 80 of housing section 90, while port 105 allows access to longitudinal bore 82.

A shaft 102 extends from the interior of first housing section 90, through bearing assembly 106, first seal assembly 98, longitudinal bore 82, and second seal assembly 100. Drill bit 84 is coupled to a drill end of shaft 102, while a drive end is coupled to motor shaft 108 by coupler 110. A coupling sleeve 112 having a lip 114 surrounds a lower portion of first housing section 90. A seal is formed between first housing section 90 and coupling sleeve 112 by two O-rings 116 and 118. The inner portion of lip 114 is disposed between one end of housing section 90 and first seal assembly 98. Quick disconnect coupling 120 engages the outer portion of lip 114 to secure sleeve 112 to first adapter 94. A portion of the interior surface of coupling 120 has threads which engage threads on the outer surface of adapter 94. A washer 122, having a center hole 123 (FIG. 4) to receive drill bit 84, is inserted between first housing section 90 and the exterior of wall 85 of container 14.

In operation, coupling 120 is tightened so that seal assembly 98 forms a first fluid barrier (by forcing packing 99 to form a seal around a first portion of shaft 102) between interior 80 of housing section 90 and longitudinal bore 82. Packing nut 103 is tightened so that seal assembly 100 forms a second fluid barrier (by forcing packing 101 to form a seal around a second portion of shaft 102) between longitudinal bore 82 and the outside environment. Hold-down assembly 36 is activated in response to a first signal from remote control panel 72. Container 14 is forced against washer 122 to form the fluid seal between housing section 90 and wall 85. In some embodiments, washer 122 is made of a material, such as lead, which allows washer 122 to conform to the contour of wall 85. In other embodiments, washer 122 is pre-formed to the contour of wall 85. The force exerted upon housing section 90 by container 14 aids in forming the first fluid barrier by further compressing packing 99.

Drill motor 46, in response to a second signal from panel 72, rotates shaft 102. Bearing assembly ].06 stabilizes shaft 102 as it rotates. Drill positioning assembly 50 is activated in response to a third signal from panel 72. Drill bit 84 is urged toward container 14, as described above in conjunction with FIGS. 1 and 2, by drill positioning assembly 50 until it comes in contact with wall 85. Drill bit 84 is then further urged toward container 14 until wall 85 is penetrated to form penetration 86. Typically, an increase in pressure within pipe 68 indicates the formation of penetration 86. The pressure within pipe 68 may be obtained by remotely monitoring transducer 71 with control panel 72. Drill positioning assembly 50, in response to a fourth signal from panel 72, retracts drill bit 84 from container 14. The fluid within container 14 can be drained or pumped out of container 14 via penetration 86, evacuation port 66, pipe 68 and valve 70.

The relatively small volume of interior 80 aids in the prevention ignition of the fluid contents by minimizing the time during which the fluid escapes through penetration 86. As the fluid escapes, the friction between the fluid and the walls of penetration 86 generates heat. The longer the escape time, the higher the temperature of the portion of container wall 14 surrounding penetration 86 becomes. The temperature may become high enough to ignite the escaping fluid. The escape time is proportional to the volume into which the fluid escapes. That is, fluid, especially in a gas phase, will escape until the pressure within the escape volume reaches equilibrium with the pressure inside container 14. The smaller the volume, the more quickly such equilibrium is reached, and the lower the amount of heating which occurs. The lower the amount of heating, the less of a chance of ignition of the fluid.

A further measure which can be taken to prevent fluid ignition is to evacuate interior 80 of air via port 66 before penetration. Additionally, after evacuation is performed, interior 80 may be pressurized with an inert gas via port 66. The pressure within interior 80 is typically raised to a point above the anticipated pressure of the contents of container 14. When penetration occurs, the more highly pressurized inert gas flows through penetration 86 into container 14. Thus, if any heating occurs, it will be to the inert gas which will not ignite. If the pressure within interior 80 is less than that of the fluid inside container 14, the inert gas dilutes the escaping fluid, thus reducing the probability of ignition.

Interior 80 may be pressurized with a passivation gas when the fluid is a strong oxidizer, such as any fluorinate compound. Typically, the passivation gas consists of approximately 20% fluorine and 80% nitrogen. The passivation gas causes a thin oxidation layer to be formed on the surfaces which are exposed to the fluid once penetration of wall 85 occurs. Such surfaces include the inner surfaces of first housing section 90, port 66 and pipe 68, as well as the outer surface of drill bit 84. The thin oxidation layer prevents the strong oxidizer within container 14 from reacting with the above mentioned surfaces.

Decontamination of a fluid, such as a poison, may sometimes be necessary. Such decontamination is accomplished by injecting a decontaminate into container 14 via pipe 68, port 66, interior 80 and penetration 86.

Eradication of living organisms within the fluid may be necessary. Such eradication is accomplished by injecting a killing agent into container 14 via pipe 68, port 66, interior 80 and penetration 86.

The pressure within longitudinal bore 82 may be monitored by pressure transducer 62. If the pressure within bore 82 increases when interior 80 is filled with an inert gas or when penetration into container 14 occurs, a leak from interior 80 into bore 82, i.e., a failure of the first fluid barrier, is indicated. In the event such a leak occurs, second seal assembly 100 prevents any fluid from leaking into the environment to reestablish the first fluid barrier, first seal assembly 98 may be replaced. Alternatively, quick disconnect coupling 120 may be tightened to further compress packing 101 and reestablish the first fluid barrier. Fluid which does leak into longitudinal bore 82 is contained by second seal assembly 100 and may be redirected to interior 21 of recovery vessel 12 by opening valve 64. The leaking fluid is thereby isolated from the external environment.

In another embodiment of the drill assembly of FIG. 3, second housing section 92, second seal assembly 100, transducer 62 and valve 64 are not installed. The operation of drill assembly 44 remains the same as outlined above. However, if first seal assembly 98 fails to maintain the first fluid barrier, the fluid from container 14 may leak directly into the interior of trailer 16, as opposed to being contained by second seal assembly 100. Sealed trailer 16, however, isolates the leaking fluid from the external environment.

FIG. 4 is an exploded isometric view of the drill assembly 44 of FIG. 3. Drill bit 84 has a shank 124 for insertion into a receiving cavity 125 within the drill end of shaft 102. Shank 124 is secured within cavity 125 by set screw 126. Set screw 126 is threaded into set screw receiving hole 128. Set screw receiving hole 128 extends from the cavity to the exterior of shaft 102.

Although the present invention and its advantages have been described in detail, it should be understood that various changes, substitutions and alterations can be made herein without departing from the spirit and scope of the invention as defined by the appended claims.

What is claimed is:

1. A sealable recovery vessel comprising a support for supporting a container and a drilling assembly located within said vessel for penetrating a wall of a container supported within said recovery vessel and allowing removal of contents from said container said drilling assembly comprising:
   a tube capable of being attached to and lining a first opening into said recovery vessel:
   a first housing having an interior:
   a first adapter for coupling said housing to a first end of said tube for partially defining a longitudinal bore:
   a shaft rotatably disposed within said bore having one end attached to a drill bit and the other end engaged with a motor: and
   a first seal assembly for forming a first fluid barrier between said interior and said longitudinal bore.

2. The scalable recovery vessel of claim 1 wherein said first housing comprises a port for allowing removal of fluid from said container via said interior.

3. The sealable recovery vessel of claim 1 wherein said first housing comprises an end portion for abutting said container wall and forming a fluid seal therewith.

4. The sealable recovery vessel of claim 1, the drilling assembly further comprising:
   a second housing:
   a second adapter for coupling said second housing to a second end of said tube to further define said longitudinal bore: and
   a second seal assembly, disposed within said second housing for forming a second fluid barrier between said longitudinal bore and an external environment.

5. The sealable recovery vessel of claim 4 wherein said second housing further comprises a pressure port for allowing a measurement of a pressure within said longitudinal bore.

6. A sealable recovery vessel comprising a support for supporting a container and a drilling assembly for penetrating a wall of a container supported within said recovery vessel and allowing removal of contents from said container, said drilling assembly comprising:
   a tube capable of being attached to and lining a first opening into said recovery vessel:
   a housing having a first section and a second section:
   adapters for coupling said first housing section to one end of said tube and said second housing section to the other end of said tube to define a longitudinal bore extending therethrough and aligned with said container on said support;
   a shaft rotatably disposed within said longitudinal bore having one end attached to a drill bit and the other end engaged with a motor;
   said drill bit being attached to said shaft within said first housing section for penetrating said container wall;
   said motor engaged to the other end of said shaft extending from said second housing section; and
   a first seal assembly disposed within said housing for forming a first fluid barrier with said shaft to prevent undesired fluid flow through said longitudinal bore.

7. The sealable recovery vessel of claim 6, the drill assembly further comprising said first housing section having one end for abutting said wall of said container and forming a fluid seal therewith.

8. The sealable recovery vessel of claim 7, the drill assembly further comprising a washer disposed between said one end and said wall of said container for forming said fluid seal.

9. The sealable recovery vessel of claim 6 wherein said first housing section includes a port for allowing removal of said fluid.

10. The sealable recovery vessel of claim 6 wherein said second housing section includes a second seal assembly for forming a second fluid barrier between said longitudinal bore and an external environment.

11. The sealable recovery vessel of claim 6 wherein said second housing section includes a pressure port for allowing measurement of a pressure within said longitudinal bore.

12. The sealable recovery vessel of claim 6, the sealable recovery vessel further comprising a bearing assembly, disposed within said first housing section and through which said shaft extends, for stabilizing said shaft.

13. The sealable recovery vessel of claim 6, the drill assembly further comprising:
   a sleeve for receiving said first housing section: and
   an O-ring, disposed between said sleeve and said first housing section, for forming a seal between an interior of said first housing section and an external environment.

14. The sealable recovery vessel of claim 6, the drill assembly further comprising a coupler for releasably coupling said first housing section to said first adapter.

15. Fluid recovery system for recovering fluid from a container having a wall, the fluid recovery system comprising:
   a recovery vessel, having a vessel interior, for receiving said container through an end opening;
   an end closure for forming a fluid tight seal between said vessel interior and an external environment:
   a support, disposed within said vessel, for supporting said container;
   a drilling assembly for penetrating said wall of the container comprising;
   a tube for lining a first opening into said recovery vessel,
   a first housing having a first housing interior and a port for allowing removal of said fluid, a first adapter for coupling said housing to a first end of said tube for partially defining a longitudinal bore, a shall rotatably disposed within said longitudinal bore having one end attached to a drill bit for penetrating, through said first housing interior, said container wall, a motor engaged to the other end of said shaft, and a first seal assembly for forming a first fluid barrier between said first housing interior and said longitudinal bore; and a hold-down assembly for urging said container and said support toward said drill assembly.

16. The fluid recovery system of claim 15 further comprising a drill positioning assembly for urging said drill bit toward and through said wall of said container.

17. The fluid recovery system of claim 16 wherein said motor, said hold-down assembly and said drill positioning assembly are operated from a remote control panel.

18. The fluid recovery system of claim 15 further comprising:

a pipe, having first and second ends, said first end coupled to said port for directing a flow of said fluid;

a valve, coupled to said second end of said pipe, for controlling said flow of said fluid through said pipe; and a pressure transducer for measuring a pressure within said pipe.

19. The fluid recovery system of claim 18 wherein said motor, said hold-down assembly and said valve are operated from a remote control panel and wherein said pressure transducer is monitored from said remote control panel.

20. The fluid recovery system of claim 15 wherein said sealable recovery vessel further comprises:

a second housing;

a second adapter for coupling said second housing to a second end of said tube to further define said longitudinal bore; and a second seal assembly, disposed within said second housing, for forming a second fluid barrier between said longitudinal bore and said environment.

21. The fluid recovery system of claim 20 wherein said second housing includes a pressure port for allowing measurement of a pressure within said longitudinal bore, the fluid recovery system further comprising:

a second pressure transducer coupled to said pressure port for measuring said pressure within said longitudinal bore; and a second valve, coupled between said pressure port and said vessel interior, for opening when said pressure reaches a predetermined value.

22. The fluid recovery system of claim 21 wherein said motor, said hold-down assembly and said second valve are operated from a remote control panel and said second pressure transducer is monitored from said remote control panel.

23. A method for removing fluid from a container having a wall comprising the steps of:

placing said container within an interior of a recovery vessel;

aligning said container with an opening defined in part by a tube extending through a wall of said recovery vessel;

urging, through said opening in said recovery vessel, a drill housing section against said container wall to form a fluid seal between an interior of said drill housing section and said recovery vessel interior;

coupling said drill housing section to said tube to partially define a longitudinal bore;

forming a first fluid barrier between said drill housing interior and said longitudinal bore;

penetrating said container wall with a drill bit disposed within said drill housing interior; and removing said fluid through a port in said drill housing section.

24. The method of claim 23 further comprising the step of filling said drill housing interior with an inert gas before penetrating said container wall.

25. A sealable recovery vessel comprising a support for supporting a container and a drilling assembly located within said vessel for penetrating a wall of a container supported within said recovery vessel and allowing removal of contents from within said container, said drilling assembly comprising:

a tube capable of being attached to and lining a first opening into said recovery vessel:

a first housing having an interior:

a first adapter for coupling said housing to a first end of said tube for partially defining a longitudinal bore:

a shall rotatably disposed within said bore having one end attached to a drill bit and the other end engaged with a mother; and a first seal for isolating said interior of the housing from the interior of the sealable recovery vessel.

26. The sealable recovery vessel of claim 25 wherein the first seal is disposed at the outer surface of the container.

27. The sealable recovery vessel of claim 25 wherein said first housing comprises a port tier allowing removal of said fluid from said container via said interior of said housing.

28. The sealable recovery vessel of claim 25 wherein said first housing comprises an end portion: and wherein said first seal is a fluid seal formed between the end portion and said container wall.

29. The sealable recovery vessel of claim 25, the drilling assembly further comprising a first seal assembly for forming a first fluid barrier between said interior and said longitudinal bore.

30. The sealable recovery vessel of claim 29, the drilling assembly further comprising:

a second housing;

a second adapter for coupling said second housing to a second end of said tube to further define said longitudinal bore: and a second seal assembly, disposed within said second housing, for forming a second fluid barrier between said longitudinal bore and an external environment.

31. The sealable recovery vessel of claim 30 wherein said second housing further comprises a pressure port for allowing a measurement of a pressure within said longitudinal bore.

* * * * *